United States Patent
Hua et al.

(10) Patent No.: US 8,639,867 B2
(45) Date of Patent: Jan. 28, 2014

(54) METHOD AND DEVICE FOR BUS ARBITRATION, CONVERTER AND PRODUCTION FACILITY

(75) Inventors: Zhidong Hua, Karlsruhe (DE); Olaf Simon, Bruchsal (DE); Wenwang Zhou, Stuttgart (DE); Cornelius Mertzlufft-Paufler, Freiburg im Breisgau (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 1154 days.

(21) Appl. No.: 12/513,450

(22) PCT Filed: Oct. 18, 2007

(86) PCT No.: PCT/EP2007/009035
§ 371 (c)(1),
(2), (4) Date: May 4, 2009

(87) PCT Pub. No.: WO2008/052668
PCT Pub. Date: May 8, 2008

(65) Prior Publication Data
US 2010/0088537 A1    Apr. 8, 2010

(30) Foreign Application Priority Data
Nov. 3, 2006 (DE) .......................... 10 2006 052 297

(51) Int. Cl.
*G06F 13/00* (2006.01)
(52) U.S. Cl.
USPC ........... 710/107; 370/330; 370/461; 370/462; 375/239; 375/260
(58) Field of Classification Search
USPC .......... 710/107, 305; 370/330, 342, 447, 461, 370/462; 375/141, 239, 260
See application file for complete search history.

(56) References Cited

U.S. PATENT DOCUMENTS

| | | | |
|---|---|---|---|
| 2,230,166 A | 1/1941 | Skanes | |
| 3,488,445 A | 1/1970 | Chang | |

(Continued)

FOREIGN PATENT DOCUMENTS

| | | |
|---|---|---|
| DE | 44 46 779 | 6/1996 |
| DE | 196 35 813 | 3/1998 |

(Continued)

OTHER PUBLICATIONS

Langton, Charan. Orthogonal Frequency Division Multiplex (OFDM) Tutorial. 2004.*

(Continued)

*Primary Examiner* — Matthew D Spittle
(74) *Attorney, Agent, or Firm* — Kenyon & Kenyon LLP

(57) ABSTRACT

A method for bus arbitration is for use when working with multi-carrier modulation methods. Each user on a bus is assigned a unique address which identifies the user and which is transmitted upon each initiation of communication. The address is represented as a sequence of binary numerals, the number of bits of the binary numerals being equal to the number of carriers used in the multi-carrier modulation method. This sequence of binary numerals is transmitted successively for the arbitration via the multi-carrier modulation method, a user being eliminated from the arbitration when a further user at the same time has transmitted a binary numeral having higher priority. The transmission of the binary numeral may be repeated if the arbitration of the numeral does not lead to a result in one step. The method for bus arbitration may be used advantageously in a system for contactless energy supply. A redundant sending of phase-shifted signals reduces the failure rate because of random destructive interference.

36 Claims, 12 Drawing Sheets

(56) References Cited

U.S. PATENT DOCUMENTS

| | | | |
|---|---|---|---|
| 4,451,881 A | 5/1984 | Grice et al. | |
| 4,626,843 A | 12/1986 | Szeto et al. | |
| 5,229,652 A * | 7/1993 | Hough | 307/104 |
| 5,296,910 A * | 3/1994 | Cole | 356/28.5 |
| 5,422,913 A | 6/1995 | Wilkinson | |
| 5,455,466 A * | 10/1995 | Parks et al. | 307/104 |
| 5,488,817 A * | 2/1996 | Paquet et al. | 56/10.2 R |
| 5,754,803 A * | 5/1998 | Regis | 710/119 |
| 5,818,821 A | 10/1998 | Schurig | |
| 5,862,226 A * | 1/1999 | Cervini | 381/2 |
| 6,005,304 A | 12/1999 | Seelig | |
| 6,026,123 A * | 2/2000 | Williams | 375/285 |
| 6,111,888 A * | 8/2000 | Green et al. | 370/461 |
| 6,125,103 A | 9/2000 | Bauml et al. | |
| 6,570,394 B1 * | 5/2003 | Williams | 324/620 |
| 6,609,172 B1 * | 8/2003 | Stringham | 710/305 |
| 6,697,350 B2 * | 2/2004 | Lomp | 370/342 |
| 6,831,551 B2 * | 12/2004 | Davenport et al. | 370/447 |
| 6,845,416 B1 * | 1/2005 | Chasmawala et al. | 710/107 |
| 6,853,690 B1 * | 2/2005 | Sorrells et al. | 375/295 |
| 6,934,167 B2 * | 8/2005 | Jang et al. | 363/21.02 |
| 6,950,389 B2 * | 9/2005 | Weerackody | 370/210 |
| 6,967,937 B1 * | 11/2005 | Gormley | 370/330 |
| 6,985,981 B1 * | 1/2006 | Hauck et al. | 710/107 |
| 7,072,380 B2 * | 7/2006 | Ozluturk et al. | 375/141 |
| 7,218,679 B2 * | 5/2007 | Kodama et al. | 375/259 |
| 7,376,961 B2 * | 5/2008 | Goodman et al. | 720/632 |
| 7,428,608 B2 * | 9/2008 | Yakashiro | 710/116 |
| 7,454,170 B2 * | 11/2008 | Goossens et al. | 455/41.1 |
| 7,505,522 B1 * | 3/2009 | Larsson | 375/260 |
| 7,769,932 B2 * | 8/2010 | Nichols | 710/107 |
| 7,792,199 B2 * | 9/2010 | Kodama et al. | 375/260 |
| 7,880,337 B2 * | 2/2011 | Farkas | 307/104 |
| 7,986,729 B2 * | 7/2011 | Kennedy et al. | 375/239 |
| 2002/0045980 A1 * | 4/2002 | Davids et al. | 701/70 |
| 2005/0225188 A1 | 10/2005 | Griepentrog et al. | |
| 2010/0088537 A1 * | 4/2010 | Hua et al. | 713/600 |

FOREIGN PATENT DOCUMENTS

| | | |
|---|---|---|
| DE | 199 11 830 | 9/2000 |
| DE | 103 49 242 | 4/2005 |
| DE | 10 2006 010 900 | 11/2006 |
| GB | 2 230 166 | 10/1990 |
| WO | 92/17929 | 10/1992 |
| WO | 2007/010083 | 1/2007 |
| WO | WO 2007/010083 | 1/2007 |

OTHER PUBLICATIONS

Hartwich et al. The Configuration of the CAN Bit Timing. Jan. 2010.*

Meyer et al. A novel system on chip for software-defined, high-speed OFDM signal processing. IEEE. 2013.*

International Preliminary Report on Patentability/Written Opinion, International Application No. PCT/EP2007/009035 filed Oct. 18, 2007.

G. Schnell, "Systeme in der Automatisierungs—und Prozesstechnik (Systems iin Automation and Process Technology)," Vieweg: Braunschweig/Wiesbaden, 5$^{th}$ Ed., Ch. 1.6.6, 2003.

The webpage: http://en.wikipedia.org/wiki/Arbitration (http//de.wikipedia.org/wiki/Arbitration, German edition, version of Aug. 9, 2006).

The webpage: http://en.wikipedia.org/wiki/Controller_area_network (http/de.wikipedia/org/wiki/Controller_Area_Network, German edition, version of Oct. 9, 2006).

The webpage: http://en.wikipedia.org/wiki/FlexRay (http/de.wikipedia/org/wiki/FlexRay, German edition, version of Oct. 14, 2006).

The webpage: http://en.wikipedia.org/wiki/Communications_channel (http/de.wikipedia/org/wiki/Kanal_%28Informationstheorie%29, German edition, version of Aug. 30, 2006).

International Search Report dated Feb. 10, 2009 issued in International Patent Application No. PCT/EP2007/009035 filed Oct. 18, 2007.

* cited by examiner

| Tr. 1 | 0 | 0 | 0 | 0 | 0 | 0 | 0 | 0 | ... |
|---|---|---|---|---|---|---|---|---|---|
| Tr. 2 | 1 | 0 | 0 | 0 | 0 | 0 | 0 | 0 | ... |
| Tr. 3 | 0 | 0 | 0 | 0 | 1 | 0 | 0 | 0 | ... |
| Tr. 4 | 0 | 0 | 0 | 1 | 0 | 0 | 0 | 0 | ... |
| Tr. 5 | 0 | 0 | 0 | 0 | 0 | 1 | 0 | 1 | ... |
| Tr. 6 | 0 | 0 | 0 | 0 | 0 | 0 | 1 | 0 | ... |
| Tr. 7 | 0 | 0 | 0 | 0 | 0 | 0 | 0 | 0 | ... |
| Tr. 8 | 0 | 0 | 0 | 0 | 0 | 0 | 0 | 0 | ... | user 1

| Tr. 1 | 0 | 0 | 0 | 0 | 0 | 0 | |
|---|---|---|---|---|---|---|---|
| Tr. 2 | 1 | 0 | 0 | 0 | 0 | 0 | |
| Tr. 3 | 0 | 0 | 0 | 0 | 1 | 0 | |
| Tr. 4 | 0 | 0 | 0 | 1 | 0 | 1 | only listen |
| Tr. 5 | 0 | 0 | 0 | 0 | 0 | 0 | |
| Tr. 6 | 0 | 0 | 0 | 0 | 0 | 0 | |
| Tr. 7 | 0 | 0 | 0 | 0 | 0 | 0 | |
| Tr. 8 | 0 | 0 | 0 | 0 | 0 | 0 | | user 2 time

Fig. 8

| C | T1 | T2 | T3 | T4 | T5 | T6 | T7 | T8 | T9 | T10 | Bus |
|---|----|----|----|----|----|----|----|----|----|-----|-----|
|   | 1  | 1  | 1  | 1  | 1  | 1  | 0  | 0  | 0  | 0   |     |
|   | 1  | 1  | 1  | 0  | 0  | 0  | 1  | 1  | 1  | 0   |     |
|   | 1  | 0  | 0  | 1  | 1  | 0  | 0  | 1  | 1  | 1   |     |
|   | 0  | 1  | 0  | 1  | 0  | 1  | 1  | 0  | 1  | 1   |     |
|   | 0  | 0  | 1  | 0  | 1  | 1  | 1  | 1  | 0  | 1   |     |
| 1 | v  | v  | v  | v  | v  | v  | x  | x  | x  | x   | 11111 |
| 2 | v  | v  | v  | x  | x  | x  |    |    |    |     | 11111 |
| 3 | v  | x  | x  |    |    |    |    |    |    |     | 11111 |
| 4 | v  |    |    |    |    |    |    |    |    |     | 11100 |

Fig. 11

| C | T1 | T2 | T3 | Bus |
|---|----|----|----|-----|
| 1 | 0  | 1  | 1  | 1   |
| 1 | 0  | 0  | 0  | 1   |
| 1 | 1  | 1  | 1  | 1   |
| 1 | 0  | 0  | 1  | 1   |
| 1 | 0  | 0  | 0  | 0   |
| 2 | 0  | 1  | 1  | 1   |
| 2 | 0  | 0  | 0  | 0   |
| 2 | 0  | 1  | 1  | 1   |
| 2 | 0  | 0  | 1  | 1   |
| 2 | 0  | 0  | 1  | 1   |

Fig. 12

METHOD AND DEVICE FOR BUS ARBITRATION, CONVERTER AND PRODUCTION FACILITY

FIELD OF THE INVENTION

The present invention relates to a method and a device for bus arbitration, a converter and a production facility.

BACKGROUND INFORMATION

From G. Schnell: Systeme in der Automatisierungs-und Prozesstechnik (Systems in Automation and Process Technology), Vieweg: Braunschweig/Wiesbaden, 5th edition 2003, Chapter 1.3.6 and from the page http://de.wikipedia.org/wiki/Arbitration, version of Aug. 9, 2006, 8:41 p.m., of the German edition of the Wikipedia Encyclopedia, arbitration is known as a method by which resources, e.g., access times to a bus, are assigned to a plurality of bus users, while avoiding conflicts, particularly conflicts in accessing s bus. Thus, the arbitration is a method for bus mediation. Example embodiments of the present invention relate to such an arbitration. In this context, an arbitration method is, in particular, a procedure established prior to the development of a possible conflict, especially during the planning and design of the bus system, based on which the bus users are able to ascertain and resolve a conflict which has arisen, this resolution involving at least the determination as to which user has a higher priority, and thus a higher precedence relative to the other participant users. For instance, the access indicated involves a transmission of data.

Conflict avoidance is necessary when working with bus systems having random, thus, non-deterministic bus-access methods. Such systems are multi-master systems, thus systems in which a plurality of bus users are allowed to access a bus independently. Example embodiments of the present invention deal especially with bus systems that use a decentralized bus mediation, thus, arbitration. Ethernet and CAN are included in such bus systems. The bus mediation is accomplished with the aid of Carrier Sense Multiple Access or CSMA.

Carrier Sense Multiple Access or CSMA is a bus mediation method by which bus users in a decentralized network are able to attain an access right to the bus. CSMA Collision Detection or CSMA/CD denotes a method in which occurring collisions are recognized and in which a repetition of the collision is avoided. CSMA Collision Avoidance or CSMA/CA is a method for collision avoidance especially in radio-based bus networks.

On the page http://de.wikipedia.org/wiki/Controller_Area_Network in the version of Oct. 9, 2006, 7:59 a.m., of the Wikipedia Encyclopedia, German edition, the Controller Area Network or CAN is described as a serial bus system in which the communications users avoid collisions when accessing the bus, using bit arbitration. In CAN bus systems, binary data are transmitted using amplitude shift keying, also known as on-off keying or OOK method, which renders a non-contact, inductive transmission difficult.

On the page http://de.wikipedia.org/wiki/FlexRay in the version of Oct. 14, 2006, 11:07 p.m., of the Wikipedia Encyclopedia, German edition, FlexRay is described as a serial, deterministic and fault-tolerant bus system for use in the automobile, comparable to TTP/C or EC-Net.

From Michael Reisner: Ethernet. Das Grundlagenbuch (Ethernet, the Book of Basics), Franzis' Publishing House (2002), Ethernet is known as a data-network technology which permits the exchange of data between devices associated in a local network.

In U.S. Pat. No. 3,488,445, an orthogonal frequency-division multiplexing or OFDM method is described as a multi-carrier modulation method for data transmission, in which a plurality of sub-signal carriers are amplitude-modulated simultaneously. These sub-signal carriers are often frequency bands in a jointly utilized medium, e.g., air or a data line. Due to the use of a plurality of sub-signal carriers, several bits are able to be transmitted per symbol. The symbol duration is considerably longer compared to single-carrier methods. As a rule, the individual bits are realized in binary fashion by the presence (logical one) or the non-presence (logical zero) of a sinusoidal excitation with a frequency, belonging to the sub-signal carrier, over the entire symbol duration.

German Published Patent Application No. 196 35 813 describes a digital transmission method, in which the communication channels, known there as carriers, assigned in the respective multi-carrier modulation method, are subdivided into subchannels known there as subblocks.

German Patent Document No. 44 46 779 and PCT International Published Patent Application No. WO 92/17929 describe methods for contactless energy transmission, in which there is an inductively weak coupling.

From the page http://de.wikipedia.org/wiki/Kanal_%28Informationstheorie%29, version of Aug. 30, 2006, 3:54 p.m., of the German edition of the Wikipedia Encyclopedia, a device, i.e., an apparatus or a carrier that is suitable for transmitting data over spatial or temporal distance is known as channel, in terms of information theory, also as communication channel.

U.K. Patent Document No. 2 230 166 describes a method for allocating resources, in which a parallel arbitration method is only initiated when an access collision is recognized. Prior to transmitting useful data via a data bus BS, the users in each case put their address in the form of a single binary-coded number on a separate arbitration bus AB, the permissible addresses having a fixed number of ones. An access collision is recognized exactly when the number of ones on the arbitration bus AB is greater than this fixed number.

U.S. Pat. No. 4,626,843 describes a bus system having multi-master communication and having a parallel arbitration of bus requests, in which each of the bus nodes has an identification number and in which relative priorities are ascertained in the arbitration from the identification number of the requesting bus node and the identification number of that bus node which last had bus access.

U.S. Patent Application Publication No. 2005/0225188 describes a method for the wireless and contactless transport of energy and data and a corresponding device, the device including a stator and a rotor, each of which is provided with windings whereby data and energy are inductively transmittable.

PCT International Published Patent Application No. WO 2007/010083 describes a device for data transmission, in which at least diagnostic signals are transmitted between a motor and a frequency converter which controls the motor, the motor and the frequency converter being connected by a motor cable, at whose two ends in each case a high-frequency data-transmission device is connected.

U.S. Pat. No. 5,422,913 describes a communication system having differential phase shift keying, in which the data to be transmitted with a low user transmission rate are multiplied by a pseudo-random code, transmitted redundantly on a transmission channel with increased transmission rate, and integrated at the receiver.

SUMMARY

Example embodiments of the present invention provide a device and a method for bus arbitration such that the failure rate is reduced.

Among features of example embodiments of the present invention with respect to a method for bus arbitration are that users which communicate via a bus are each assigned a uniquely identifying sequence of identification units, a number n of numbered bidirectional communication channels being used, the number n being greater than one, and at least one communications user initiating a communication, in doing which, at the beginning of the communication in a first time interval with respect to the communication initiation, the communications user checking whether a further user having a higher priority is initiating a communication, the priority being determined by comparing the information sent out via the communication channels upon initiating communication and the information received from the further user via the communication channels upon initiating communication, the first time interval including a plurality of time segments, where a) in a first time segment, an identification unit is transmitted by a communications user via the communication channels, and at the same time, the signals present on all communication channels are detected, b1) upon agreement of the detected signals with the transmitted identification unit, in a time segment following the first time segment, the communications user continues with a next identification unit according to step a), d) after transmitting the complete identification, the communications user begins with the transmission of useful data.

In this context, the advantage is that a further alternative method for bus arbitration is made available which is characterized by the simultaneous use of a plurality of communication channels. Due to the use of a plurality of channels, the bandwidth of the transmission is increased compared to the use of a single channel, thereby permitting a longer time duration of the individual signal words, while retaining the same transmission rate. This longer time duration is advantageously usable in the case of inductive coupling of the signal transmission. Thus, the signal is able be transmitted inductively with reduced error rate.

Owing to the check test upon initiation of communication, it is possible to dispense with a superordinate communications user which regulates the communication sequence in the event of access conflicts. Therefore, new users are able to be linked into the bus in simple modular fashion, and in the same way, dispensable users are able to be removed. In particular, it is possible to dispense with a reprogramming of a central bus control.

The beginning of communication denotes the instant at which a user begins to transmit signals which precede the intended transmission of useful data. These signals, which take place according to a protocol established during the planning and design of the bus, are transmitted in a first time interval. They indicate the initiation of communication by the user in question.

By subdividing the first time interval into time segments, a bus having bus clocking may be used. Preferably the clock-pulse segments of a bus clocking are used as time segments. The identification is able to be split into identification units, which are assignable to the time segments. It is further advantageous that the individual time segments are doubly usable, on one hand for transmitting one's own identification units, and on the other hand for receiving signals of further users.

Advantageously, electrical conductors, wires, hollow conductors, dielectrics and air, that is, vacuum or the physical space per se, are usable as physical realizations of a communication channel. A communication channel may also advantageously take the form of a directional radio link or a non-directional signal-transmitting device and/or signal-receiving device.

Example embodiments of the present invention are usable advantageously in a system for the non-contact transfer of energy, including a secondary coil that is inductively coupled to a primary-conductor system and that, especially for forming a resonant circuit, is connected in series or in parallel to a capacitor such that the associated resonant frequency corresponds substantially to the alternating-current frequency of the primary current. The current in the secondary coil has two components, and specifically, first of all, the transformed current component familiar in the case of transformers, and secondly, a resonance current component which is caused by the resonant-circuit configuration. The secondary coil is connected in series and/or in parallel to at least one capacitor in such a way that the resonant frequency corresponds substantially to the medium frequency. In this manner, a high efficiency is ensured in the transmission, even when working with a weak inductive coupling as occurs, for example, in the case of a large air gap between the primary conductor and secondary conductor. The resonant-circuit configuration allows the transfer of energy over a large air gap. In spite of the large air gap, a high efficiency factor is achievable. A system for the non-contact transfer of energy includes loads inductively coupled to a primary line, a substantially constant medium-frequency alternating current being injected into the primary line, in particular, substantially independently of the power drawn by the loads. The current is injected independently of the number of loads and the power drawn. In each case, the loads include one or more capacitors which is/are connected in series and/or in parallel to a secondary coil feeding the load, such that the corresponding resonant frequency corresponds substantially to the medium frequency. Therefore, a large air gap may be realized between the primary conductor and secondary coil.

In example embodiments, the communication channels are frequency bands, differing from each other, on one common carrier. Therefore, known carriers such as metallic conductors or vacuum, i.e., air may advantageously be used.

In example embodiments, the carrier is additionally used for the non-contact transfer of energy; in particular, the carrier takes the form of a primary conductor of a system for contactless energy supply. This is advantageous in that it is possible to save on transmission cable, and a high degree of protection of the system is attainable on account of the consequent saving on plug connections.

In example embodiments, signals are only detected on those communication channels on which no signals are sent out by the communications user when sending out the identification unit.

In example embodiments, the first time interval includes a plurality of time segments, b2) in response to deviation of the detected signals from the transmitted information unit, the communications user ascertains from the deviating detected signals the priorities of the further communications users which have transmitted signals, and in a time segment following the current time segment, the communications user continues with a next information unit according to step a) if it possesses the highest priority among the priorities ascertained.

The advantage is that it is possible to dispense with a dialogue between two users to determine the priority, since information about the priority of the sender may already be deduced from the information unit determined in each case for all users. It is further advantageous that the priority information is splittable into individual units in such a way that, in the case of several users transmitting simultaneously, it is possible to ascertain iteratively which user possesses the highest priority, and consequently is allowed to transmit useful data. In particular, all users do not have to wait until the complete priority has been communicated.

In example embodiments, the first time interval includes a plurality of time segments, c) the communications user switching to a listening mode or a waiting mode when it does not possess the highest priority among the priorities ascertained.

In the listening mode, the user stops the transmission process and continues to monitor the bus. The completion of the transmission process by the user having the highest priority is therefore ascertainable by the users having lower priority. Thus, the bandwidth of the bus system may be utilized advantageously, in particular, idle times, thus, time intervals without a transmission process by a user, are avoidable.

In the waiting mode, the user stops the transmission process and waits a stipulated time span before it undertakes a further action. A new initiation of communication is executable as such an action. A robust bus arbitration is thus advantageously provided.

Among features of example embodiments of the present invention with respect to a method for bus arbitration are additionally or alternatively that a plurality of communications users are provided as bus users on a bus, each communications user being assigned a unique address as a sequence of numerals, the bus being clocked, and upon initiating communication, each communications user transmitting the numerals in the order of the sequence of its address one after another as an FDM signal or OFDM signal onto the bus for the duration of one clock-pulse segment of the bus clocking, at the same time listening in to the FDM signal or OFDM signal present on the bus, and in the following clock-pulse segment dropping out of the arbitration if it detects a further communications user whose presently transmitted numeral has a higher priority than its own. This has the advantage that an arbitration method is made available for an asynchronous serial bus system which, instead of amplitude shift keying, allows a signal transmission by sinusoidal signals. Places with inductive coupling are thereby able to be incorporated into the transmission path of the signals, which means the transmission path is also able to connect users that are movable relative to each other. It may be that the sinusoidal shape of the signals results in a slower transmission rate, but this is offset advantageously by a simultaneous use of a plurality of communication channels.

In example embodiments, the bus includes a plurality of communication channels, and the following steps are executed in a time sequence:
i) in a first clock-pulse segment, each communications user sends the first numeral in its sequence of numerals to the communication channels, and at the same time listens in to the communication channels,
ii) in the following clock-pulse segment, each communications user breaks off the process and/or enters a different state when the signal monitored on the communication channels is formed by a superimposition of the transmitted numeral with a numeral of higher priority,
iii) in the following clock-pulse segments, each communications user repeats steps i) and ii), upon each repetition, one communication channel less being evaluated according to a predefined sequence, until the monitored signal of the evaluated communication channels is no longer able to be formed from the superimposition of the respective component of its transmitted numeral and a further numeral,
iv) in the following clock-pulse segment, each communications user begins with the transmission of useful data via the communication channels if the numeral determined is the last numeral in its sequence of numerals,
v) each communications user continues with step i) with the next numeral in its sequence of numerals.

Thus, an arbitration method is provided which, in each case, produces a clear winner that, moreover, is clearly recognized for the losers, as well.

In example embodiments, the numerals and useful data are transmitted via the communication channels using the OFDM method, each communication channel being formed by one frequency band on an electric line, especially a two-wire line, coaxial line or other two-pole line. This is advantageous in that lines for the energy supply are at the same time useable for transmitting data, especially for the arbitration.

In example embodiments, a plurality of communications users are linked to the bus, a number being assigned to each communications user, the following steps being executed in a time sequence:
i) the communications user determines the first numeral in the numerical representation with respect to the base n of its number,
ii) the communications user transmits a signal on the communication channel whose number is identical to the numeral determined, and at the same time listens in to the remaining communication channels,
iii) the communications user breaks off the process and/or goes into a different state when transmission was carried out during step ii) on a communication channel having a higher number than the numeral determined,
iv) the communications user begins with the transmission of useful data if the numeral determined is the last numeral in the numerical representation with respect to base n of its number,
v) the communications user determines the next following numeral in the numerical representation with respect to base n of its number and continues with step ii).

The advantage in this case is that a bus arbitration is available for multi-carrier modulation methods. In particular, a method is described by which access conflicts, even those in the event of simultaneous access by three or more users, are reliably mediated. Moreover, it is especially advantageous that all available channels of the multi-carrier modulation method are usable for the bus arbitration. In the case of a simultaneous access by three and more users, it is reliably ascertainable, which priorities are involved in the access conflict, so that each user is able to make a decision with a low degree of error about its own withdrawal from the communication attempt.

In example embodiments, a base different from the channel number is taken as a basis for the numerical representation.

In example embodiments, a communications user transmits a signal on a reserved communication channel when it is certain for the communications user, especially based on the signals present on the bus, that it will win the arbitration process. The communications users which receive a signal on the reserved communication channel terminate the arbitration and drop out if they are not winners of the arbitration process.

Preferably a communication channel held in readiness for transmitting addresses is used as reserved communication channel. It may be that one bit of the address transmission is thereby sacrificed; however, on average, the arbitration is accelerated. The advantage in this context is that in situations where the potentially losing communications users are not yet able, based on signal superimposition, to clearly decide whether they will be unsuccessful, the arbitration process is able to be shortened by the signaling on the part of the potential winner, especially when a method is used in which each numeral of the address is transmitted repeatedly up until a definitive clarification. Therefore, although for the moment, the loss of one address bit on the reserved channel causes a lengthening of the address, thus, an increase in the number of numerals from which each address is assembled, this is offset in that fewer repetitions are necessary for the arbitration of an individual numeral.

In example embodiments, the transmitted signals are sinusoidal or result from a superimposition of sinusoidal signals, the number of superimposed sinusoidal signals being less than or equal to the number of communication channels. Sinusoidal signals may be used especially advantageously in the OFDM method, and moreover, allow low-distortion data transmission via inductive couplings. Due to the low distortion, the error rate of the data transmission during the arbitration is reduced.

Alternatively, instead of the sinusoidal signals, in general wavelets, e.g., Haar wavelets, Daubechies wavelets, Coiflet wavelets and Meyer wavelets are used for the superimposition. Due to the low temporal dispersion or the temporal localization in a brief time interval compared to the temporally unlimited sinusoidal signals, distortions at the beginning and end of transmission are reduced in this case.

In example embodiments, each signal is essentially transmitted over the time duration of one clock-pulse segment onto the bus, the symbol duration of each transmitted information unit therefore being substantially equal to the time duration of one clock-pulse segment, deviations of the two time durations from one another on the order of the duration of transient phenomena of the signals being acceptable. Therefore, sufficient time is available in which, for example, one signal may be transmitted in low-error fashion via an inductive coupling location in the transmission path. Consequently, the bus clock pulse determines the progress and, with that, the maximum duration of an arbitration process, as well, which means the time necessary for an information communication may be better estimated. A user with low priority can only be eliminated with the expiration of a clock-pulse segment, and a communication can be initiated only with the beginning of a clock-pulse segment. Due to this clocking, collisions often occur which make arbitration necessary, and the method of example embodiments of the present invention describes an expedient routine for settling such conflicts.

In example embodiments, the number or sequence of identification units assigned to the user uniquely identifies it, an order relation, in accordance with which the term higher number is used, being defined with respect to the quantity of all numbers or sequence of identification units assigned to users and/or with respect to the numerals of the numbers or the identification units. Preferably, an order relation is predefined with respect to the numerals of the numbers or the identification units, from which the order relation with respect to the quantity of all numbers or sequence of identification units assigned to users results. In this case, it is advantageous that the number or the sequence of identification units is usable as placeholder for the otherwise freely selectable designation of each user, the naturally given order relation with respect to the natural numbers being available as priority ranking. It is further advantageous that the arbitration may be carried out numeral-wise or identification-unit-wise. Therefore, the number of communication channels required does not scale with the number of users. The duration of the arbitration phase is merely prolonged when the number of users increases. Thus, a multitude of users may be provided when working with a limited number of communication channels.

In example embodiments, the number or sequence of identification units assigned to the user is its numerical address, the order relation being defined by the natural order of the addresses. This is advantageous in that the number assignment and the awarding of priority are configurable simply, comprehensibly and with low error, since the address of a user and the address assignment to a user are easily manageable in bus-system technology.

In example embodiments, the zero crossings of the signal for the contactless energy transmission are used for the synchronization of the communication, particularly by detecting a signal pulse which is emitted close in time to the zero crossing. Thus, the synchronization of the internal clocking of the users with the bus clocking may be realized advantageously.

In example embodiments, at least one communication channel includes a plurality of subchannels, the communications users transmitting the signals, determined for one communication channel, as signals with relative, randomly determined phase shift on the subchannels of the communication channel. Advantageously, a reduced error rate is thus achievable by redundancy.

In this context, these subchannels, thus, taken by themselves, are likewise communication channels, however are hierarchically combined to form groups, which in each case define one communication channel. In other words, the subchannels assigned to one communication channel are not completely independent of each other in their use, thus, simultaneous possibility of occupancy with signals, but rather correlations or secondary conditions exist caused by the intended redundancy of the signal transmission, while subchannels belonging to different communication channels are independent of each other in their use.

In example embodiments, a communication channel is evaluated by a communications user as receiving a signal when a signal is detected on at least one of the subchannels of the communication channel. The advantage in this case is that, in a simple and robust manner, the redundancy provided is usable for reducing the error rate, particularly for avoiding transmission errors because of random destructive interference.

In example embodiments, the signals are transmitted on the communication channels or subchannels of the conductor using an OFDM method. The advantage here is that a method for bus arbitration is made available for the OFDM method which uses all communication channels of the OFDM method and is therefore compatible with the OFDM method.

In example embodiments, the frequencies of the communication channels do not lie in the harmonic series of the contactless energy transmission or at least not in the set of the first three harmonic components of the signal of the contactless energy transmission. Therefore, interfering coupling of the contactless energy transmission into the signal transmission is advantageously reduced. For example, interferences with a multiple of the fundamental frequency of the contactless energy transmission result due to processes in the feeder electronics of the contactless energy transmission or reaction of the loads.

In example embodiments, the frequencies of the communication channels lie in the harmonic series of a fundamental frequency. Thus, the redundant transmission of the signals on subchannels is advantageously feasible with the aid of the relative phase shift of a plurality of signals.

In example embodiments, useful data are converted with the aid of FFT and/or IFFT for transmission and/or for reception to or from the bus, especially for data transmission using the OFDM method. This is advantageous in that a rapid conversion of the data conveyed in binary fashion by a bus to a format usable for the OFDM method is feasible.

In example embodiments, the communications users are drive assemblies, particularly inverter motors or matching controllers for the powering of loads. This is advantageous in that an OFDM method is able to be combined with a system having contactless energy supply. In this context, it is advantageous that the time constant of the OFDM method, thus, the time duration of the signal words is selectable to be approximately equal to or greater than the time constant of reflections in the primary conductor of the system. Since the OFDM method uses sinusoidal signals, an erroneous interpretation of an echo as additional signal or as additional information is avoidable. Advantageously, it is thus possible to save on line terminations for the signal transmission. The use of the OFDM method in systems having contactless transfer of energy is further advantageous because the sinusoidal signals, in comparison to square-wave signals, thus pulses, are able to be coupled inductively with reduced signal falsification into the primary conductor.

Among features of example embodiments of the present invention with respect to a device for bus communication are that a plurality of communications users are linked to one bus, the communications users having device(s) for arbitration and communication on a plurality of frequency channels. The advantage in this context is that the communicated signal words are present over a longer time span, while the transmission rate remains the same. Therefore, the error rate of the communication may be reduced, and inductive couplings, which in particular allow a relative movement, are in the transmission path.

In example embodiments, the communications users are supplied via a power bus and/or the communications users have device(s) for communicating via the power bus on a plurality of frequency channels. Advantageously, it is thus possible to save on lines.

In example embodiments, the communications users are supplied in contactless fashion via a power bus and/or the communications users have device(s) for contactless communication via the power bus on a plurality of frequency channels, especially using the OFDM method. Advantageously, it is thus possible to save on plug-in connections, and a system in a higher protection class is feasible.

In example embodiments, the communications users have device(s) for determining the zero crossings of the signal for the contactless energy transmission. Therefore, a synchronization of the time segments or time clocking of the communication method used, for instance, an OFDM method, is able to be realized.

In example embodiments, a device for producing a phase shift of random magnitude between two signals is provided. Thus, a method for avoiding transmission errors with the aid of redundant signal transmission is usable.

In example embodiments, device(s) for data conversion with the aid of FFT and/or IFFT are provided. Thus, useful data are able to be converted rapidly into the format of the bus system.

In example embodiments, the device has a device for the non-contact drawing of energy from a primary conductor and/or a device are provided for the contactless energy supply. Consequently, the advantages of contactless energy supply are able to be combined with the advantages of multi-carrier arbitration. In particular, the primary conductor is usable for data communication.

Among features of example embodiments of the present invention with respect to a converter are that device(s) are provided for transmitting and/or receiving data in the OFDM method, a method for bus arbitration being executable in the converter. Thus, in the case of the converter, the method for bus arbitration is advantageously usable for OFDM methods. In particular, the converter is therefore able to be integrated according to a type of module into a system having bus communication.

Among features of example embodiments of the present invention with respect to a production facility are that drive units are supplied with energy in contactless fashion, and that data are exchangeable at least between the drive units via a bus, the drive units having device(s) for implementing a method according to example embodiments of the present invention, and/or the drive units each including a device of example embodiments of the present invention for bus communication. This offers the advantage that a production facility may be developed in which the advantages of contactless energy supply may be combined with those of a data exchange via a bus system. The drive units together with the bus therefore form a bus system.

Example embodiments of the present invention may be used especially advantageously for multi-master bus systems, particularly FlexRay, Ethernet, CAN, Foundation Fieldbus, PROFIBUS, inter-bus or for multi-carrier modulation methods.

Further features and aspects are described below.

List of Reference Characters
11, 12, 13, 14 loads
15 energy source
16 primary conductor
120 load
122 communication channel
124 signal coupling
126 data communication
130 load
132.1-132.4 communication channel
134 signal coupling
136 data communication
301 modem
302 data source
303 data sink
304, 305 buffer
306 bus controller
308 frequency-assignment device
309 random phase generator
310 enable signal
311 amplitude evaluation unit
312 device for inverse fast Fourier transformation (IFFT)
313 device for fast Fourier transformation (FFT)
314 parallel-to-serial converter
315 serial-to-parallel converter
316 digital-to-analog converter
317 analog-to-digital converter
401, 402 user
403 beginning of transmission
404 identification
405 end of transmission
410 useful data 411 address frame
412 data packet
420 error-checking information
430 listening mode
500 medium-frequency signal
501 first user
502 second user
503 third user
504 identification
508 beginning of transmission
509 end of transmission
510 useful data
511 address frame
512 data frame
520 error-checking information
530 listening mode
601-605 signals
606 resulting signal
607 area able to be monitored
608 blind area

BRIEF DESCRIPTION OF THE DRAWINGS

The present invention will now be explained in detail with reference to the figures,
in which:

FIG. 8 shows an arbitration process between two users, using eight communication channels, FIG. 11 shows an alternative arbitration method when using a plurality of communication channels, FIG. 12 shows an alternative arbitration method when using a plurality of communication channels with one winner bit.

DETAILED DESCRIPTION

Figure 1:
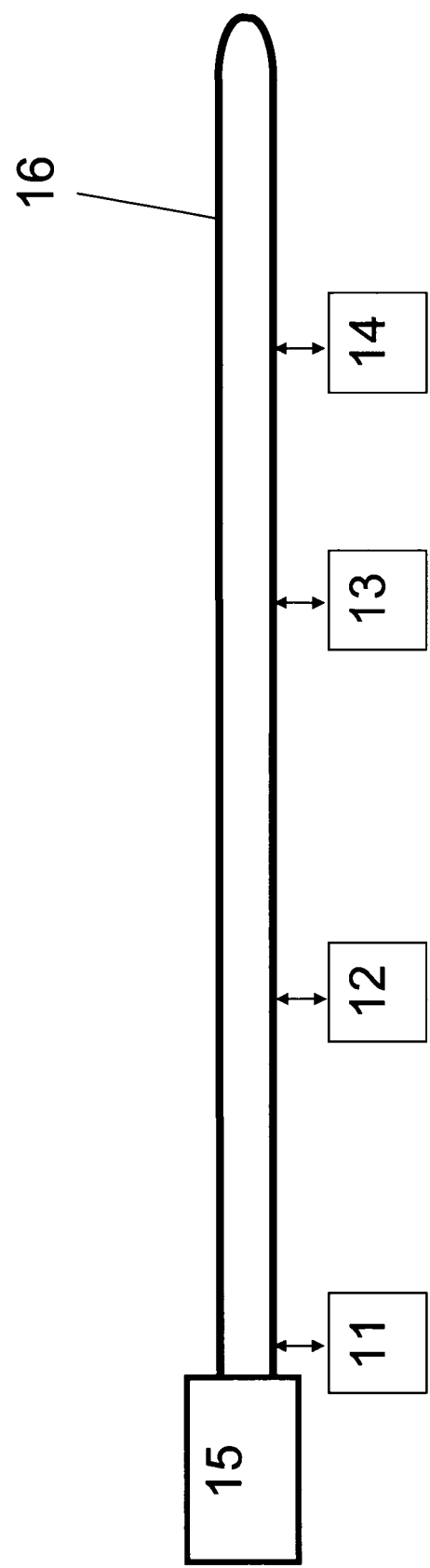
FIG. 1 shows a system for the contactless energy supply of movable loads.

FIG. 1 shows a system for the contactless supply of energy to a plurality of movable loads 11, 12, 13, 14 from an energy source 15. Energy source 15 impresses a constant medium-frequency current of 25 kHz onto a primary conductor 16, which transfers energy inductively to secondary coils of loads 11-14 via a weak resonant coupling. For instance, inverter motors are provided as loads 11-14. For the energy coupling, capacitors are connected in series or in parallel to the secondary coils such that the resonant frequency is approximately equal to the frequency of the medium-frequency current. To that end, advantageously 25 kHz is selected.

Provided at energy supply 15 are further device(s) for data modulation and demodulation on primary conductor 16. Loads 11-14 have exactly the same devices and communicate via primary conductor 16 and the devices provided at energy supply 15.

This communication takes place via the OFDM method, in which a plurality of communication channels having different frequencies are used simultaneously. In this document, communication channel is understood to be a channel in the information-theoretical sense. For the transmission, each communication channel uses a medium that, for example, may take the form of a frequency band of electromagnetic waves in air or a metallic conductor, an optical conductor or a separate metallic conductor. Further media for transmitting signals are familiar and are usable for example embodiments of the present invention. Signals in the form of sinusoidal wave packets are transmitted via these channels.

Figure 2:
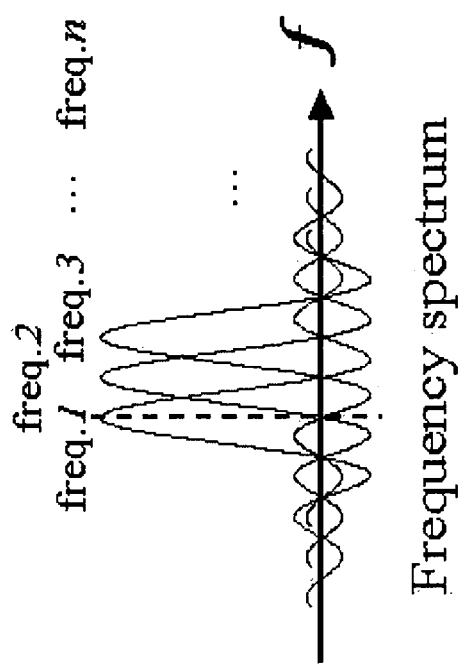
FIG. 2 shows the frequency spectrum utilized in the OFDM method.

FIG. 2 shows the real part of the frequency spectrum used for each channel. The broken line marks the mid-frequency of the first channel, thus the frequency used mainly for the signals transmitted via the first channel. The frequency spectra of all other channels have no component at this point, which means the individual channels may be separated. Orthogonality is further related in the mathematical sense to a finite time interval. Thus, the mid-frequencies form a part of a harmonic series of a fundamental frequency, in other words, are integral multiples of a fundamental frequency.

Eight channels are used in the system described in FIG. 1. The frequency band for the data transmission extends from 75 kHz to 1200 kHz. The frequencies for the data transmission are selected so that they do not fall on the first three harmonic components of the medium-frequency current. In particular, the frequency bands used around the respective mid-frequencies thus do not overlap with the first three harmonic components of the fundamental frequency of the medium-frequency current. In this context, a sufficient distance is provided between the values of the frequencies of the medium-frequency current and the values of the frequency bands of the data transmission, so that mutual influencing, especially coupling of components of the medium-frequency current into the data transmission is reduced.

The length ratios in the system according to FIG. 1 are such that loads 11-14 receive the OFDM signals as near-field signals. Signal propagation times may therefore be assumed approximately as vanishing, signal wavelengths as infinitely long.

In further exemplary embodiments according to the present invention, the length of the primary conductor is a multiple, in particular, more than tenfold the maximum wavelength of the OFDM signals.

Figure 9:
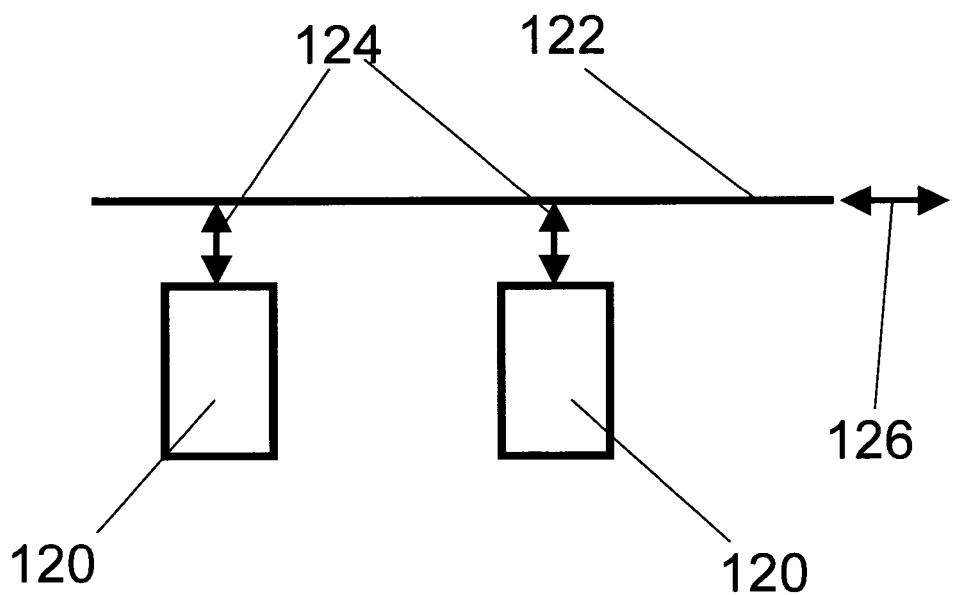
FIG. 9 shows the communication of loads via a single communication channel.

FIG. 9 shows schematically the communication of loads 120 via a single communication channel 122 according to the related art. This communication channel takes the form of a bus line, thus, a cable. Loads 120 give to and receive data from communication channel 122 via a signal coupling 124. This signal coupling 124 is based on an inductive coupling or on a coupling via an electrical plug-in contact.

In this manner, loads 120 communicate with each other or with a central control (not shown) or a further bus via a data communication 126.

Figure 10:
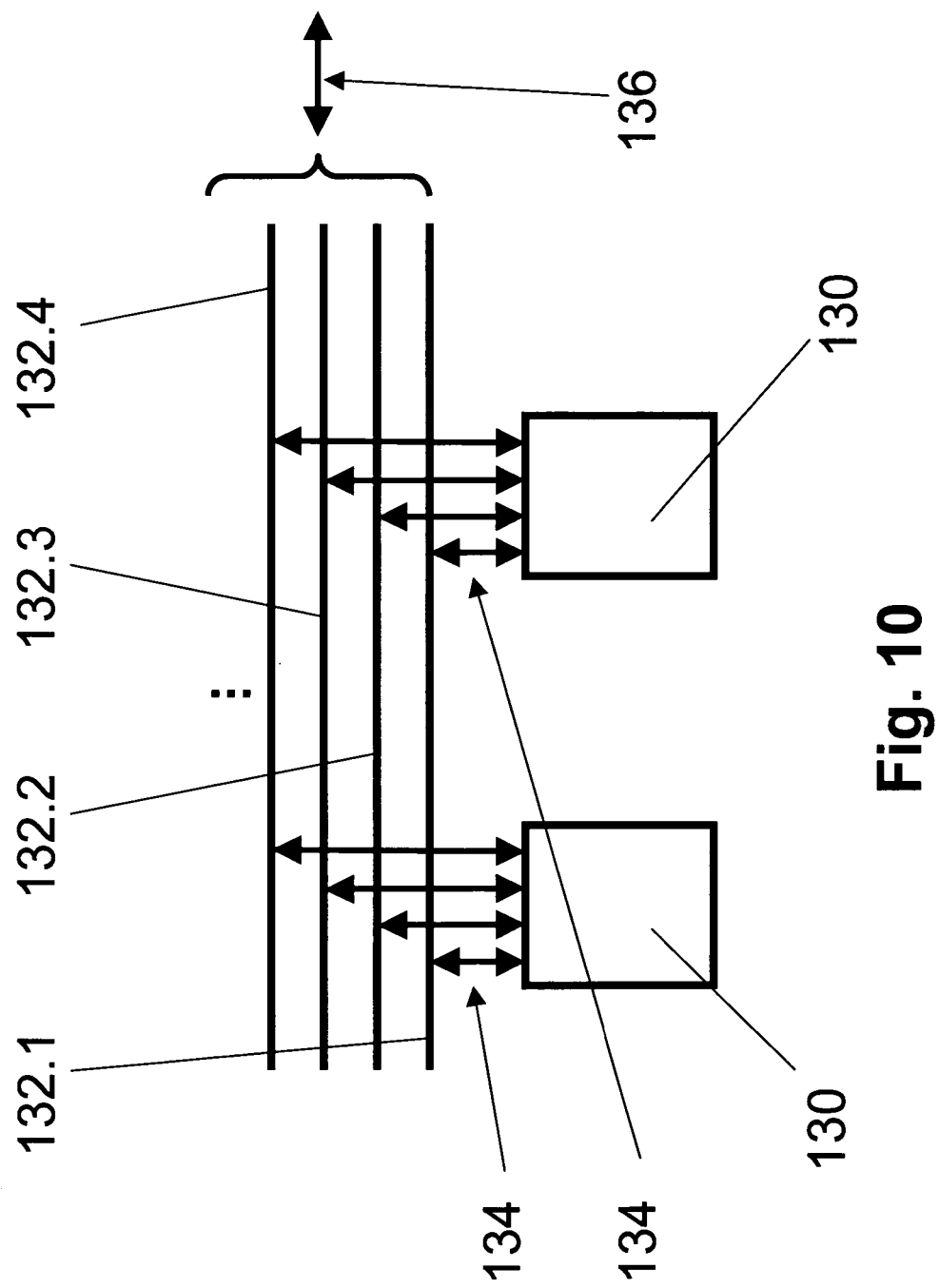
FIG. 10 shows the communication according to an example embodiment of the present invention of loads via a plurality of communication channels.

FIG. 10 shows schematically an example embodiment according to the present invention of the communication of a plurality of loads 130 via communication channels 132.1-132.4. Each load 130 is linked to communication channels 132.1-132.4 via a signal coupling 134. The communication channels take the form of reserved frequency bands in one carrier, and therefore represent subcarriers. The carrier is realized by a metallic conductor, e.g., a wire, a cable or a line. Signal coupling 134 is accomplished in physically inductive fashion. Loads 130 communicate with each other via communication channels 132.1-132.4 or with a central control (not shown) or a further bus (likewise not shown) via a data communication 136.

In exemplary embodiments of the present invention, more communication channels 132.1-132.4 are used than the number shown. This is illustrated in FIG. 10 by points.

In exemplary embodiments of the present invention, signal coupling 134 is accomplished in physically capacitive or galvanic manner.

Figure 3:
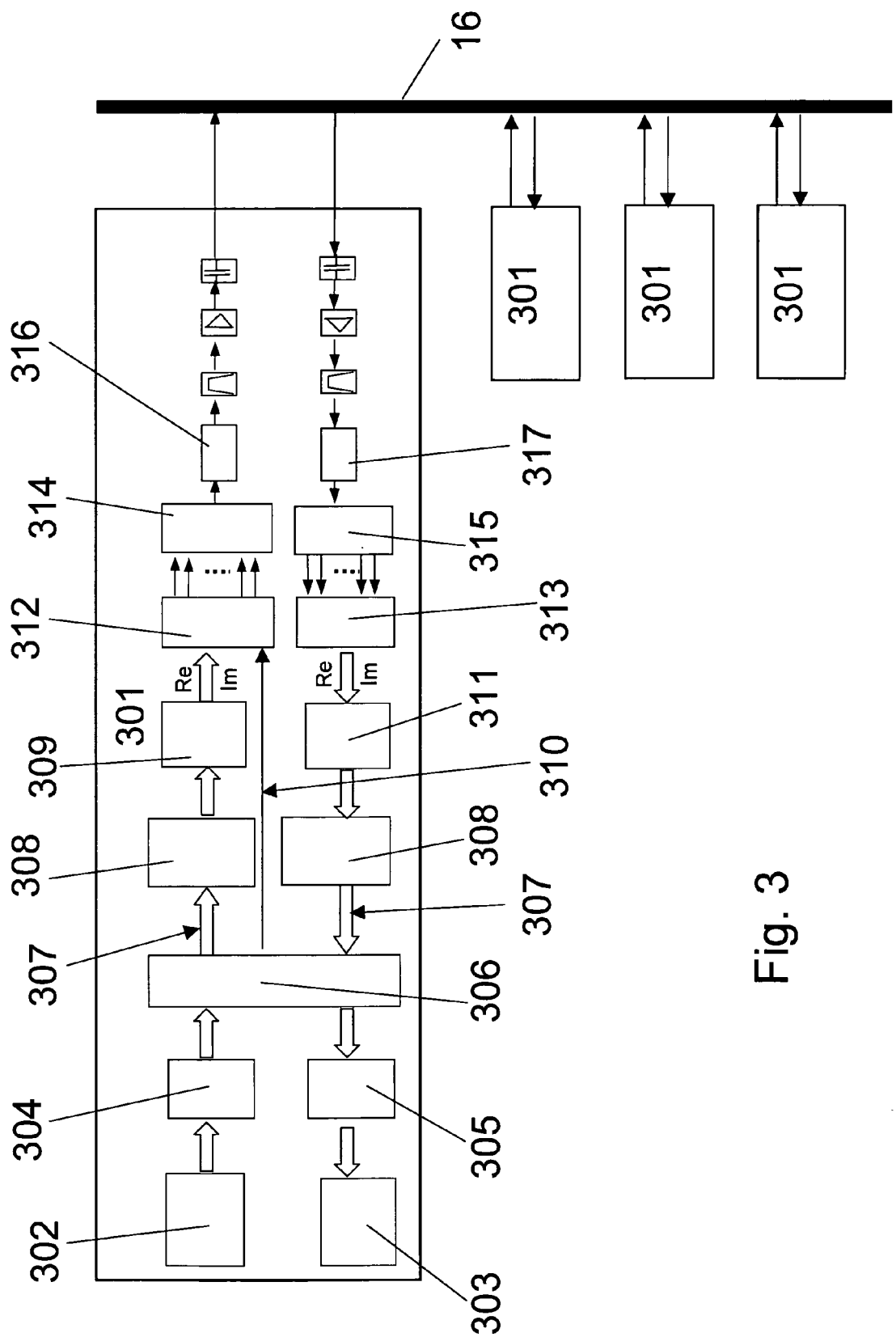
FIG. 3 shows the functional components of a modem for transmitting and receiving data via the OFDM method.

Shown symbolically in FIG. 3 is a modem 301 which is linked to a primary conductor 16 for receiving and sending data. Such a modem 301 is integrated into each load 11-14 shown in FIG. 1.

Modem 301 includes a data source 302, a data sink 303, buffers 304, 305, a bus controller 306, frequency-assignment device 308, a random phase generator 309, device 312 for inverse fast Fourier transformation, IFFT for short, device 313 for fast Fourier transformation, FFT for short, a parallel-to-serial converter 314, a serial-to-parallel converter 315, a digital-to-analog converter 316, an analog-to-digital converter 317, a band-pass (filter), a high-pass (filter), operational amplifier and a device for galvanic decoupling.

The modem operates as described in the following. Data is transferred from a data source 302 via buffer 304 to bus controller 306. Bus controller 306 transfers the data to frequency-assignment device 308. Bus controller 306 also controls and monitors the arbitration phase. Frequency-assignment device 308 represents the data of that numerical representation whose base is equal to the number of transmission channels used. The numerical representation ascertained is passed on numeral-wise in the direction of the arrow. Using an enable signal 310, the bus controller actuates random phase generator 309 which ascertains a relative phase shift for the two copies of the numerals sent from frequency-assignment device 308. This doubling of the signal with relative phase shift increases the redundancy of the data transmission and thus reduces the failure rate. The numerals and the phase shift are combined at a device for IFFT 313 to form superimpositions of sinusoidal signals according to the numerals. These sinusoidal signals are converted in a parallel-to-serial converter 314 into a signal variable over time and passed on via a digital-to-analog converter 316, a high-pass filter, an operational amplifier and a galvanic decoupling element to bus 16. Bus 16 is implemented as a HF litz wire, thus as a multi-conductor cable, the individual cable conductors being insulated from one another. The area from frequency-assignment device 308 up to bus 16 therefore represents the area in which the OFDM method is realized.

Conversely, modem 301 receives signals, variable over time, via a galvanic decoupling element, an operational amplifier, a band-pass filter that, in particular, separates high-frequency interferences and the medium-frequency energy signal, and an analog-to-digital converter 317, the signals being converted into numbers via a serial-to-parallel converter 315 and device for FFT 313. Via an amplitude-evaluation unit 311 and a frequency-assignment device 308, a number according to the numerical representation, whose number base is equal to the number of channels used, is ascertained from the numerical sequence transmitted and is passed on to bus controller 306. Bus controller 306 transmits the received data via a buffer 305 to a data sink 303.

In an exemplary embodiment, the coupling and uncoupling of data onto or from bus 16 is not accomplished capacitively as shown, but rather inductively or galvanically with the aid of plug connectors or with the aid of penetration pins using penetration technology.

In an exemplary embodiment, bus 16 is implemented as a litz wire in which the individual conductors are not electrically insulated from each other.

In an exemplary embodiment, bus 16 is provided by the physical space or by air, signals being transmitted with the aid of radio transmission.

Figure 4:
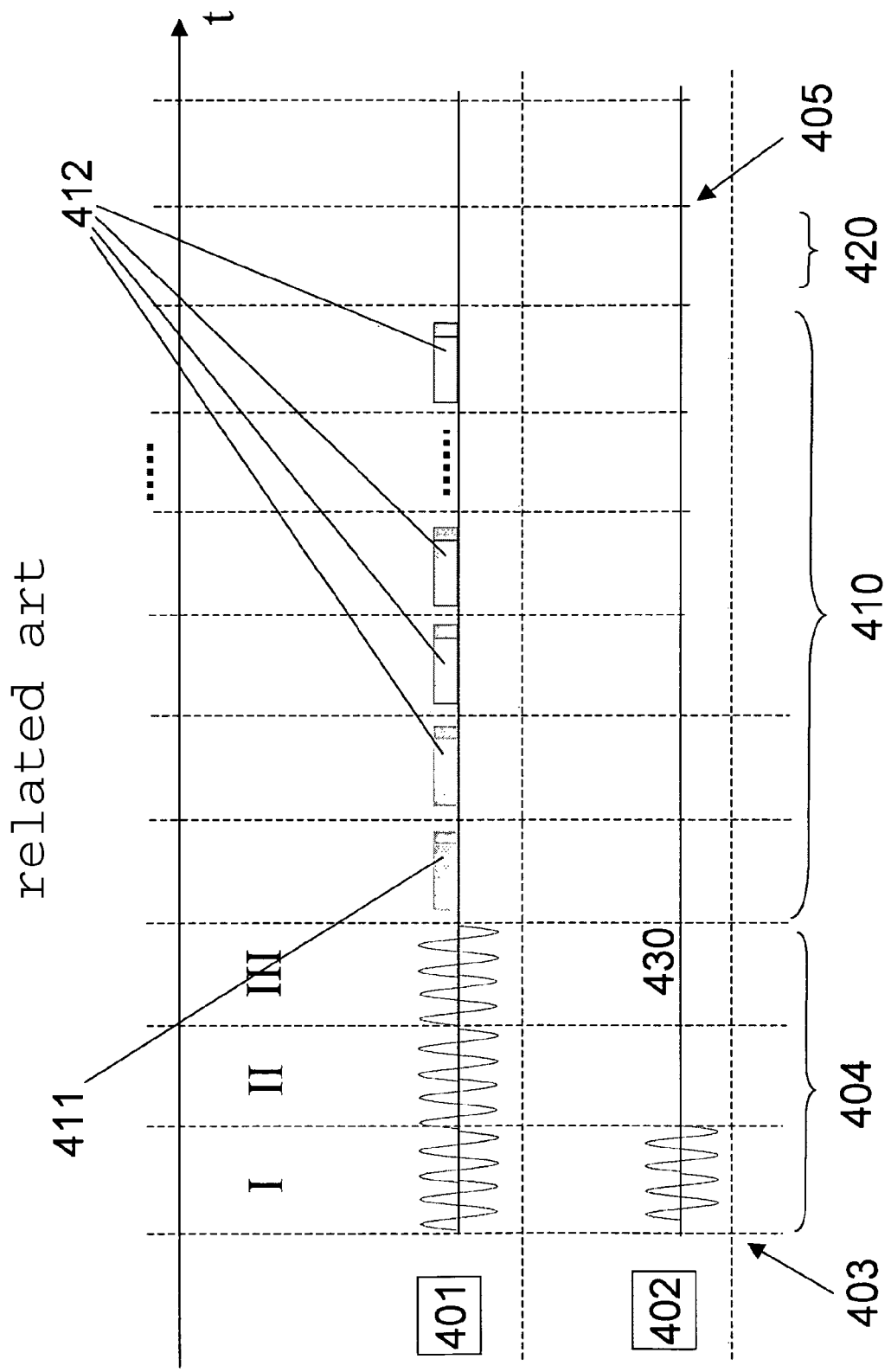
FIG. 4 shows an arbitration method when using one communication channel.

FIG. 4 shows the progression of a conventional arbitration method, in which thus only one communication channel is used.

Shown is the time characteristic of the signals transmitted by two users 401, 402. This signal pattern is subdivided into time segments denoted by I, II, III, etc., each of which contains one symbol.

Both users 401, 402 begin simultaneously at 403 with their identification 404, in which each user transmits its binary coded address and at the same time monitors the transmission channel. Identification 404 may also be denoted as identifier. Beginning of transmission 403 and identification 404 thus form the initiation of communication by a user.

In the first time segment, both users 401, 402 transmit a signal, thus, datum "1". In the following time segment, only a first user 401 sends a signal, while the second user transmits datum "0", thus sends no signal. Due to the monitoring of the transmission channel taking place at the same time, second user 402 determines that a signal was transmitted by another user. As a result, user 402 breaks off its transmission and changes to listening mode 430, thus, to the listen-only mode. In this context, listening mode 430 is a state of the user in which the user listens in to the bus but does not transmit, and waits until the bus is cleared or until the user recognized as transmitting has finished its data transmission.

First user 401 continues the transmission of its address. After complete transmission of the address, it begins to send useful data 410 which is made up of address frame 411 and data packets 412. An item of error-checking information 420 concludes the transmission at 405.

If more than two users begin transmitting identification 404 simultaneously, then gradually, except for one, they go over to listening mode 430 according to the method described, since each user is clearly identifiable by its address.

Figure 5:
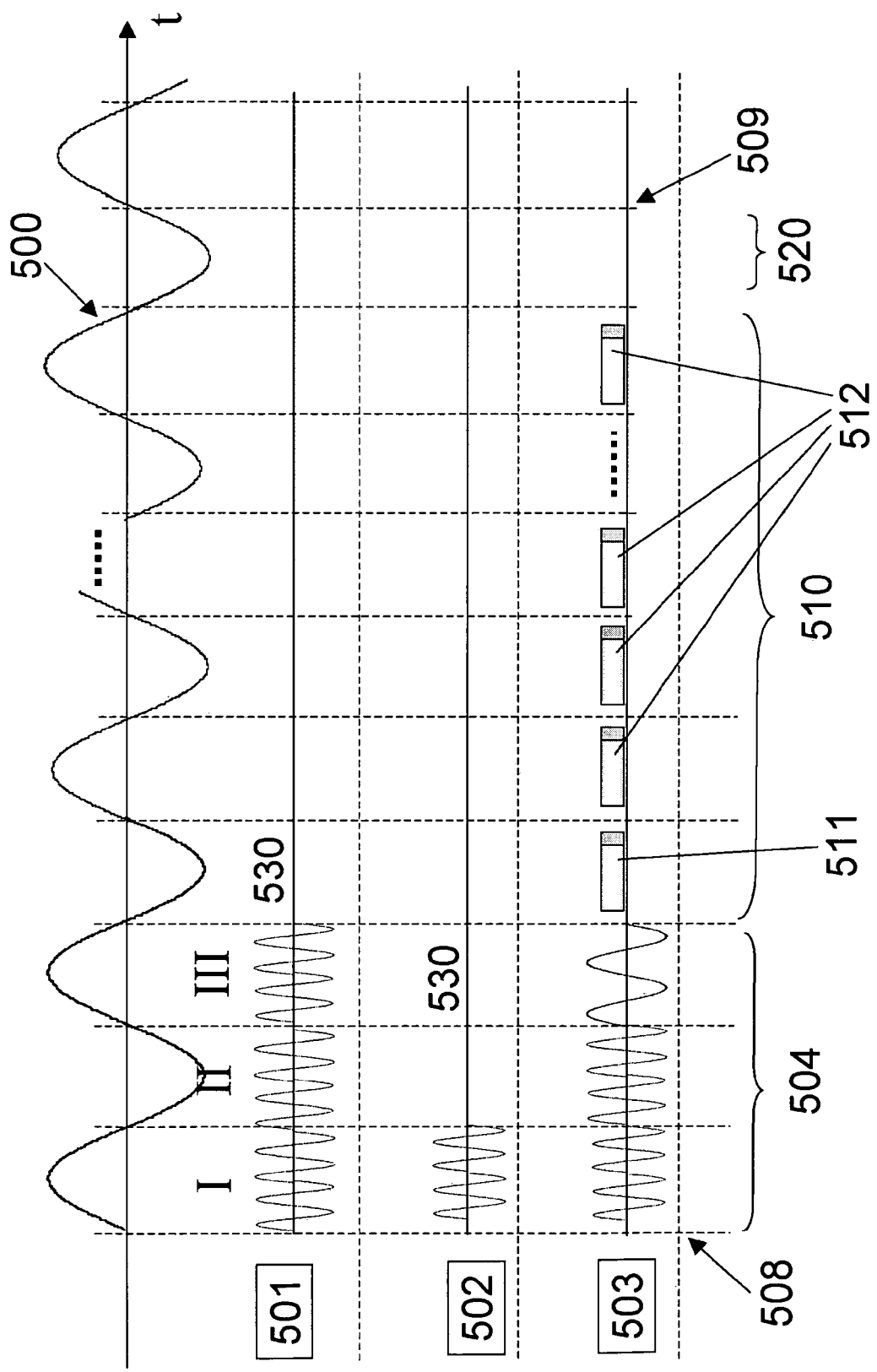
FIG. 5 shows an arbitration method when using a plurality of communication channels.

FIG. 5 shows the progression of an arbitration process in the OFDM method according to example embodiments of the present invention. Eight channels are used for the communication. Shown at the top in FIG. 5 is the time characteristic of medium-frequency signal 500, under which are the signal sequences of first user 501, of second user 502 and of third user 503.

Time segments of the same duration are denoted by I, II, III, which are passed through one after another in time. Each time segment is used to transmit one symbol, thus one smallest information unit in the bus system. Therefore, the sequence of time segments corresponds to a clocking of the bus system and an internal clocking of the users.

The zero crossings of medium-frequency signal 500 are used for synchronizing the symbols transmitted in each time segment in the OFDM method, e.g., by detecting the zero crossing or a synchronization pulse which is sent out close in time to the zero crossing, thus, when the instantaneous magnitude of medium-frequency signal 500 lies below a critical value.

Due to this synchronization, users 501-503 detect the beginning of each new time segment synchronously at the same instants. Therefore, the internal clocking of each user 501-503 is synchronized with the clocking of the bus system.

Communications users 501-503 have internal clocks which are synchronized at regular intervals in the manner described. The synchronization is always carried out when the end of a time segment falls on the area around a zero crossing of the medium-frequency signal.

A method and a device for synchronization using the zero crossing is described in German Patent Document No. 103 49 242. The subject matters of this document are part of the exemplary embodiments of the present invention.

The three users begin simultaneously with the identification at 508 by transmitting numeral-by-numeral their address, coded with respect to the number base nine. To that end, they emit wave packets of different frequency. At the same time, the channels on which no signal is transmitted are monitored.

In a first time segment, all three users (501, 502, 503) transmit one signal, the first identification unit, on the same channel. None of the three users perceives a further user, since all are transmitting the same signal.

In the time segment (not shown) immediately prior to the first time segment, all three users (501, 502, 503) have monitored the bus and checked whether a further user was already transmitting. The signal was transmitted in the first time segment because no further user was already transmitting.

In a second time segment, first user 501 and third user 503 transmit one signal, the next following identification unit, on the same channel, while second user 502 does not transmit. Consequently, second user 502 detects that further users are transmitting and changes to listening mode 530. First user 501 and third user 503 each perceive no further user, since their transmitted signal agrees with the detected signals.

In a third time interval, first user 501 transmits a signal on a channel of higher mid-frequency than user 503. Thus, first user 501 detects that a further user is transmitting. Since a higher priority is assigned to the channel used by third user 503 than to that of first user 501, first user 501 changes to listening mode 530.

The order relation of the communication channels used for determining the priority is thus as follows: A first user has a higher priority than a second user when it is transmitting on a channel of lower frequency than the second user. A user has a lower priority than a second user what it is not transmitting and the second user is transmitting anyway on one channel.

After identification is completed, third user 503 begins with the transmission of useful data 510, which is made up of address frame 511 and data frames 512. Error-checking information 520 concludes the transmission at 509.

In a further refinement, this error-checking information 520 also includes the information that the transmission is concluded. Due to this information, a user in listening mode 530 is induced to start a new transmission attempt.

In exemplary embodiments, in each case users 501, 502 do not change to listening mode 530, but rather to a waiting mode. After a fixed time span or a fixed number of time segments has/have elapsed, users 501, 502 begin again with the transmission of their identification.

In exemplary embodiments, 16, 32, 52 or 88 channels or more are used. The frequency band reserved for the data transmission lies between 50 kHz and 20 GHz, especially between 75 kHz and 5 GHz.

In the monitoring of the channels, the possibility exists that a user will be located in the node of the signal sent out by another user, or that in the case of one user, the signals sent out by other users on the same channel will cancel each other out.

Figure 6:
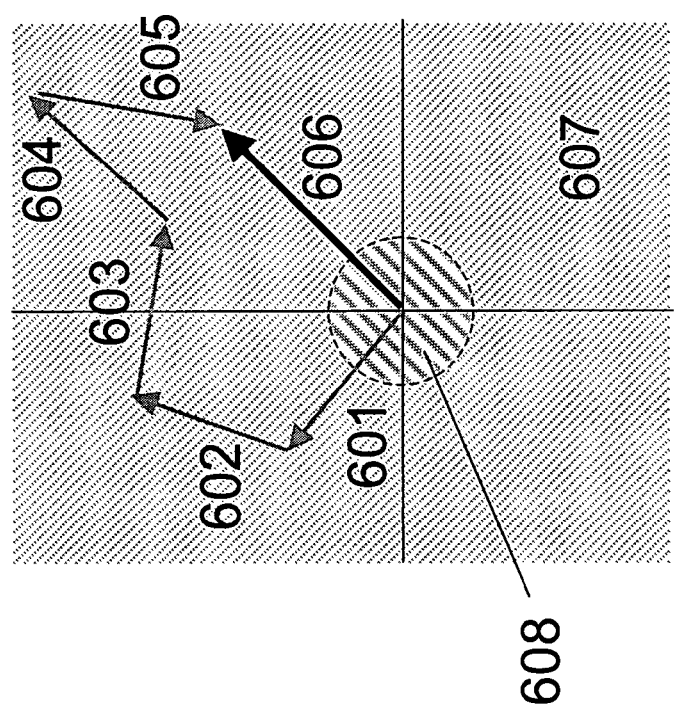
FIG. 6 shows the interference of various signals on a communication channel.

FIG. 6 shows the interference of sinusoidal signals 601-605, which were transmitted by different users on the same channel. The amplitude and phase of each signal are represented in each case as a vector. The individual vectors are shifted for the vector addition. The signal resulting from the interference is represented by vector 606. A user recognizes a signal when its vector 606 points into area 607 able to be monitored, thus outside of blind area 608. The angles of individual vectors 601-605 represent phase shifts which result due to the coupling of loads 11-14 in FIG. 1 to the primary conductor, e.g., by altering the inductance of the coupling coil on the basis of a mounting configuration deviating from a setpoint configuration, by the laying of the primary conductor and the presence of additional loads 11-14 and/or inductances along the transmission path in primary conductor 16. The effects of the propagation time of the signals in primary conductor 16 also play a role here, given primary conductors 16 of corresponding length.

Figure 7:
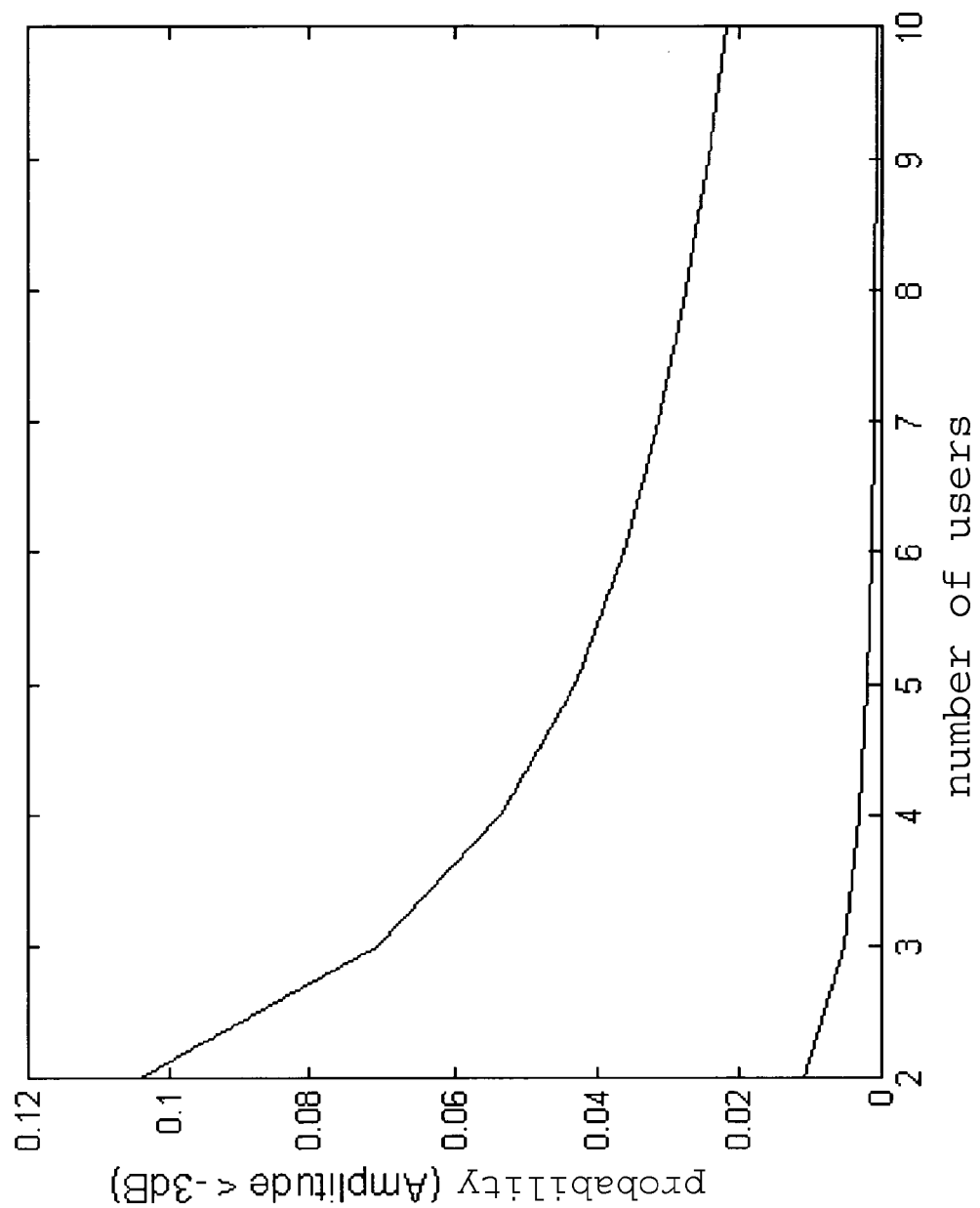
FIG. 7 shows the dependence of the transmission-error rate on the number of users in the case of an arbitration method according to an example embodiment of the present invention.

The upper curve in FIG. 7 shows the result of the simulation of the failure rate as a function of the number of users, it being evaluated as failure when, due to interference, the signal amplitude is less than −3 dB.

In the method of example embodiments of the present invention, each channel is subdivided into two subchannels. Each user (11-14, 601-605) wanting to transmit a signal on a channel transmits this signal on each of the two associated subchannels, however with a randomly determined relative phase shift. Relative phase shift is understood to be a difference of the initial phases of the sinusoidal signals sent out on the subchannels, thus, the phase angle between the displacements of the sinusoidal signals at the beginning of the corresponding time segment. In the monitoring of the channels mentioned in connection with FIG. 5, in each case both subchannels are evaluated simultaneously. A signal is recognized on a channel when it was recognized on at least one subchannel. Thus, a logic OR operation of the signals of the subchannels is realized. Therefore, the probability of an erroneous evaluation due to random destructive interference in the case of a user (11-14, 601-605) is further reduced, and the lower curve in FIG. 7 is yielded as the result of a simulation. In other words, owing to the use of a randomly determined, relative shift of the initial phases, in the event of destructive interference on one subchannel, the probability of the occurrence of destructive interference on the respective other subchannel is reduced. In this case, the subchannel having destructive interference is used as reference for the other subchannel, and the randomly determined phase shifts in each instance bring about a phase shift on the other subchannel, which results in non-destructive superimposition.

In an exemplary embodiment, when working with the method described, particularly advantageous use is made of the fact that the subchannels are realized by assigned frequencies and associated frequency bands, whose values have a common divisor.

A method and a device for producing phase shifts in multi-carrier modulation methods are described in German Published Patent Application No. 10 2006 010 900. The subject matters of this document are part of the exemplary embodiments of the present invention.

FIG. 8 shows the progression of an arbitration as mapped in bus controller 306. Shown is the variation with time of the channel occupancies (Tr.1 through Tr.8) of two users, the channels being arranged in a priority sequence determined beforehand. The individual columns in the table shown correspond to the time segments of the bus clocking. An entry "1" means that a signal is sent in the corresponding channel in the corresponding time segment; an entry "0" means that no signal is sent. Both users observe the OR operation of both tables in the monitoring. In the first to the fifth time step, neither of the two users determines that a further user has transmitted. In the sixth time step, user 2 determines that another user has transmitted on channel number 5. Since this channel has a higher priority than channel number 4 it itself used, user 2 changes to the listening mode. At the same time, user 1 determines that a further user has transmitted on channel number 4. Since this channel has a lower priority than the channel it itself has used, user 1 continues the transmission process.

FIG. 11 shows an arbitration process among ten users T1-T10, using five communication channels, in which, in the steps of the arbitration process, users T1-T10 in each instance transmit a signal on more than one communication channel.

The method described takes place in the course of the clock-pulse segments of the bus clocking following one after another. One cycle of the arbitration process is executed in each clock-pulse segment. The cycles are described in the following.

FIG. 11 shows the arbitration of a single numeral. Each user T1-T10 has ascertained from its address one numeral which, in the binary representation, has exactly three ones and two zeros. This numeral is entered into the column of each user T1-T10.

Thus, in the first cycle of the arbitration process, denoted by the row having the entry 1 in column C, each user T1-T10 transmits its numeral onto the bus. Therefore, the signal "11111" entered under bus is present on the bus. In this context, the first position of the entry corresponds to the communication channel entered at the very top in the columns of the users, the second position to the second topmost, etc.

In the same clock-pulse segment, each user ascertains which signal is actually present on the communication channels of the bus. This signal is yielded from the transmitted signal and from the signals transmitted by other users by superimposition in the sense of a logic OR operation. Thus, in one clock-pulse segment, the signal "1" is present on each communication channel exactly when at least one user transmits this signal in the clock-pulse segment. The users therefore possess not only device(s) for transmitting, but also device(s) for receiving. Preferably, the transmitting and receiving are accomplished by inductive coupling into a two-pole bus line.

Based on the signal on the bus, users T7, T8, T9, T10 therefore recognize that further users have transmitted, which have transmitted a "1" on the first communication channel topmost in the table, and which therefore have a higher priority. Users T7, T8, T9 and T10 consequently go over to a listening mode or a waiting mode, denoted by the entry "x" in their column.

Users T1, T2, T3, T4, T5 and T6 do not recognize whether further users having higher priority have transmitted. This is denoted by a "v" in the respective column.

The users having a "v" in their column thereupon transmit their numeral again in a second cycle. This second cycle is shown symbolically in the row having the entry "2" under column "C". The second cycle takes place in a clock-pulse segment of the bus clock which follows the clock-pulse segment of the first cycle in time.

The second communication channel, beginning from the top in the table, is now compared.

Users T4, T5, T6 determine that further users have transmitted on the second communication channel, and therefore have a higher priority. Consequently, they change over to the listening mode or waiting mode. Here, as also in the following, this is again symbolized by an entry "x" at the appropriate position in the table.

Users T1, T2, T3 determine no further users having higher priority. They therefore continue the arbitration process. Here, as also in the following, this is again symbolized by an entry "v" at the appropriate position in the table.

Users T1, T2, T3 now transmit their numeral again in a third cycle. This third cycle is shown symbolically in the row having the entry "3" under column "C".

In the third cycle, the information on the third communication channel is now compared.

Users T2 and T3 recognize that a further user having a higher priority has transmitted and change over to the listening mode or waiting mode.

Remaining user T1 now transmits its numeral again in a fourth cycle. This third cycle is shown symbolically in the row having the entry "4" under column "C".

User T1 determines that no further user having higher priority has transmitted, since its transmitted numeral agrees with the signal on the bus, and the numerals allowed have exactly three ones.

If the numeral transmitted is the last numeral in its address, it then begins with the transmission of useful data.

If the numeral transmitted is not the last numeral of its address, then it and all possibly existing users which have transmitted the same numeral continue with the next arbitration step in which the next numeral is transmitted.

The fourth cycle may also be omitted since, based on the signal on the bus, user T1 already recognizes in the third cycle that it is the winner, and since all further users after the processing of three communication channels with a one are either likewise winners or are eliminated.

For example, if only users T2 and T3 were present, the signal "11011" would be on the bus in the second cycle. User T2 would already now know that it is the winner, and user T3, that it will be eliminated.

It may be that in the example shown in FIG. 11, user T1 already knows in the first cycle that it will be the winner, however user T2 is unable to recognize that it must drop out because the ones on the third communication channel could also come from user T8. That is why a further cycle is necessary.

The order relation used is therefore the usual order relation between numbers, the highest power in the binary representation being assigned to the communication channel at the very top in the table.

In an exemplary embodiment, only communication channels in which a one was transmitted at all are evaluated in sequence in the cycles. This is apparent based on the signal on the bus.

In exemplary embodiments, only numerals having a fixed number of ones and zeros in the binary representation are allowed, the number of ones being different from three and/or the sum of the number of ones and the number of zeros being different from five.

Compared to the method according to FIG. 8, the method according to FIG. 11 has the advantage that every numeral transmits a greater content of information. Thus, when working with five channels, it is not five different numerals that are able to be transmitted as in a method analogous to FIG. 8, but rather ten different numerals as shown in Table 11.

Particularly advantageous conditions result if the number of ones is approximately, thus except for a difference of zero or one, equal to the number of zeros allowed. From the standpoint of combinability, the number of numerals available is then at its maximum.

The method described is also usable when the number of ones in each permissible numeral is not fixed. In this case, all communication channels are processed one after another in cycles, at least, however, up to the point that the winner is unequivocally certain, thus even for the remaining users.

FIG. 12 shows another arbitration process of example embodiments of the present invention in the form of a table. Three users T1, T2 and T3 are represented, each of which sends one numeral onto a bus. The numerals are each four-digit in the binary representation, there being no limitation of the number of ones.

In the framed row, a reserved communication channel is shown, which is not used for transmitting the numerals of the address, but rather for the premature conclusion of the arbitration. This communication channel is used for transmitting a winner bit to all users which indicates when a winner of the arbitration has been definitely decided, so that the other users are able to terminate the arbitration.

In the example according to FIG. 12, a user T1 transmits the numeral "0010", T2 transmits the numeral "1010" and T3 transmits the numeral "1011".

User T1 recognizes that further users having higher priority are transmitting and changes to a waiting mode.

Based on the signal on the bus, user T3 recognizes that it will be the winner, because no user has transmitted a one on a communication channel on which T1 has transmitted a zero.

Users T2 and T3 transmit their address again. In addition, T3 transmits a one on the reserved communication channel in order to signal that it is the winner. This is denoted in the table by the lower framed area.

Based on the signal on the bus, user T2 is unable to recognize whether the further user has transmitted a "1011" or a "1001". In the latter case, it would be the winner. However, since a one is transmitted on the additional channel, it changes over to the waiting mode.

Due to the use of the reserved channel for signaling, the duration of the arbitration is therefore shortened on average.

The reserved channel may also be used to advantage in the example according to FIG. 11. In this case, user T1 could already signal in the first cycle its superiority compared to the other users. In the event that only users T4, T5 and T6 are present, T4 may already signal its superiority in the second cycle.

In exemplary embodiments, the communication channels already processed are not transmitted again in the individual cycles, but rather the numerals are cut off or truncated An evaluation of the monitored communication channels in question is omitted, or the communication channels in question are not listened to at all and/or are not acted on by signals at all. The omission or masking of these communication channels takes place according to a fixed scheme, a fixed sequence, which is known to all users. For example, in the case of the repetitions represented in the description with respect to FIG. 11, initially the very top communication channel—in the table of FIG. 11—, then the second topmost communication channel and so forth are omitted in the evaluation. Since for the communication channels suppressed or masked out in each case, a comparison of the priorities has already taken place in the preceding clock pulse, a repeated comparison would yield nothing new, because all remaining users are transmitting the same signal on this communication channel.

In exemplary embodiments, the number of subchannels per channel is further increased, thereby again reducing the failure rate.

In exemplary embodiments, the full circle is divided into a number of equal partial circles, and the random relative phase shift is determined in steps of this discretization. The use of 90°- or 180°-steps is especially advantageous, since in this case, the relative phase shift of the signals is obtained by sign change in the real parts or imaginary parts of the Fourier-transformed signals.

In exemplary embodiments, the frequency of the medium-frequency current lies between 10 kHz and 100 kHz.

In an exemplary embodiment, the bus system is included by a system whose spatial size is selected to be so large that in the case of signal transmission between two communications users, the receiving communications user essentially detects the far field of the signal going out from the transmitting communications user. In this case, transmission errors caused by the positioning of one user in the nodal point of the signals of another user are advantageously avoided using example embodiments of the present invention.

Example embodiments of the present invention relate generally to a method for bus arbitration for use when working with multi-carrier modulation methods, e.g., OFDM or FDM. Each user on a bus is assigned a unique address which identifies the user and which is transmitted upon each initiation of communication. The address is represented as a sequence of binary numerals, the number of bits of the binary numerals being equal to the number of carriers used in the multi-carrier modulation method. This sequence of binary numerals is transmitted successively for the arbitration via the multi-carrier modulation method, a user being eliminated from the arbitration when at the same time a further user has transmitted a binary numeral having a higher priority. The transmission of the binary numeral may be repeated if the arbitration of the numeral does not lead to a result in one step. The method for bus arbitration may be used advantageously in a system for contactless energy supply. A redundant sending of phase-shifted signals reduces the failure rate because of random destructive interference.

What is claimed is:

1. A method for bus arbitration, comprising:
assigning each user that communicates via a bus a uniquely identifying sequence of identification units, a number n of numbered bidirectional communication channels being used, the number n being greater than one;
initiating, by at least one communications user, a communication;
at a beginning of communication in a first time interval with respect to the communication initiation, checking, by the at least one communications user, whether a further user having a higher priority is initiating a communication, the priority being determined by comparing information sent out via the communication channels upon initiating communication and information received from the further user via the communication channels upon initiating communication, the first time interval including a plurality of time segments;
in a first time segment, transmitting an identification unit by a communications user via the communication channels, and at the same time, detecting signals present on all communication channels;
upon agreement of the detected signals with the transmitted identification unit, in a time segment following the first time segment, continuing, by the communications user, with a next identification unit; and
after transmitting a complete identification, beginning, by the communications user, a transmission of useful data;
wherein, in response to deviation of the detected signals from the transmitted identification unit, the communications user ascertains, from the deviating detected signals, the priorities of the further communications users which have transmitted signals, and in a time segment following the current time segment, the communications user continues with a next identification unit if no user possesses a higher priority;

wherein the communication channels are frequency bands, differing from each other, on one common carrier;

wherein a communication channel is evaluated by a communications user as receiving a signal when a signal is detected on at least one subchannel of the communication channel; and wherein a communications user transmits a signal on a reserved communication channel when it is definite for the communications user, based on the signals present on the bus, that it will win an arbitration process, and the communications users which receive a signal on the reserved communication channel terminate drop out of the arbitration if they are not winners of the arbitration process.

2. The method according to claim 1, wherein the communications user switches to at least one of (a) a listening mode and (b) a waiting mode when the communications user does not possess a highest priority among the priorities ascertained.

3. The method according to claim 1, wherein the time segments correspond to clock-pulse segments of a bus clocking.

4. The method according to claim 1, wherein the signals are transmitted via the communication channels using an OFDM method.

5. The method according to claim 1, wherein the communication channels are used both for arbitration and for transmitting useful data.

6. The method according to claim 1, wherein in addition to communication, the carrier is also used for contactless transfer of energy, wherein the carrier takes the form of a primary conductor of a system for contactless energy supply.

7. The method according to claim 1, wherein the identification units are inductively coupled into a carrier and inductively coupled out of the carrier.

8. A converter, comprising:
a device adapted to at least one of (a) transmit and (b) receive data via a bus using an OFDM method, the device adapted to perform the method according to claim 1.

9. The converter according to claim 8, further comprising a device adapted for contactless energy supply.

10. A method for bus arbitration, a plurality of communications users being provided as bus users on a bus, each communications user being assigned a unique address as a sequence of numerals, the bus being clocked with a bus clocking, comprising:
upon initiating communication, transmitting, by each communications user, the numerals in an order of the sequence of the address one after another for a duration of one clock-pulse segment of the bus clocking as at least one of (a) an FDM signal and (b) an OFDM signal onto the bus;
at the same time, listening in to the at least one of (a) the FDM signal and (b) the OFDM signal present on the bus; and
in a following clock-pulse segment, dropping out of arbitration upon determining a further communications user having an instantaneously transmitted numeral with a higher priority;
wherein the bus includes a plurality of communication channels;
wherein a communication channel is evaluated by a communications user as receiving a signal when a signal is detected on at least one subchannel of the communication channel;
wherein a communications user transmits a signal on a reserved communication channel when it is definite for the communications user, based on the signals present on the bus, that it will win an arbitration process, and the communications users which receive a signal on the reserved communication channel terminate drop out of the arbitration if they are not winners of the arbitration process.

11. The method according to claim 10, wherein the communication channels are frequency bands, differing from each other, on one common carrier.

12. The method according to claim 10,
further comprising, in a time sequence:
(i) in a first clock-pulse segment, sending, by each communications user, a first numeral in the sequence of numerals to the communication channels, and, at the same time, listening in to the communication channels,
(ii) in a following clock-pulse segment, at least one of (a) breaking off, by each communications user, the process and (b) entering a different state when the signal monitored on the communication channels is formed by a superimposition of the transmitted numeral with a numeral of higher priority;
(iii) in following clock-pulse segments, repeating, by each communications user, (i) and (ii), upon each repetition, one communication channel less being evaluated according to a predefined sequence, until the monitored signal of the evaluated communication channels is no longer able to be formed from the superimposition of the respective component of its transmitted numeral and a further numeral
(iv) in a following clock-pulse segment, beginning, by each communications user, transmission of useful data via the communication channels if the numeral determined is the last numeral in its sequence of numerals; and
(v) continuing, by each communications user, with (i) with the next numeral in the sequence of numerals.

13. The method according to claim 10, wherein the numerals and useful data are transmitted via the communication channels using an OFDM method, each communication channel being formed by one frequency band on at least one of (a) an electric line, (b) a two-wire line, (c) a coaxial line, and (d) a two-pole line.

14. The method according to claim 10, wherein at least one of (a) the number and (b) the sequence of identification units assigned to the user uniquely identifies the user, according to which the priority is determined, being defined with respect to at least one of (a) a quantity of all numbers or sequence of identification units assigned to users and (b) the numerals of the numbers or the identification units.

15. The method according to claim 10, wherein at least one of (a) the number and (b) the sequence of identification units assigned to the user is the numerical address, an order relation being defined by a natural order of the addresses.

16. The method according to claim 10, wherein at least one communication channel includes a plurality of subchannels, the communications users transmitting the signals determined for one communication channel as signals having a relative, randomly determined phase shift on subchannels of the communication channel.

17. The method according to claim 10, wherein zero crossings of the signal for contactless transfer of energy are used for synchronization of the communication by detecting a signal pulse which is emitted close in time to the zero crossing.

18. The method according to claim 10, wherein at least one of (a) the transmitted signals are sinusoidal and (b) a superimposition of sinusoidal signals is obtained, a number of superimposed sinusoidal signals being less than or equal to the number of communication channels.

19. The method according to claim 10, wherein each signal is transmitted onto the bus substantially over a time duration of one clock-pulse segment.

20. The method according to claim 10, wherein the signals are transmitted on at least one of (a) the communication channels and (b) subchannels of a conductor, using an OFDM method.

21. The method according to claim 10, wherein frequency bands of the communication channels do not overlap with a first three harmonic components of the current signal, of a contactless energy transmission.

22. The method according to claim 10, wherein frequencies of the communication channels lie in a harmonic series of a fundamental frequency, rising continually from the fundamental frequency.

23. The method according to claim 10, wherein with the aid of at least one of (a) FFT and (b) IFFT, useful data are converted for at least one of (a) transmission and (b) for reception at least one of (a) to and (b) from the bus, for data transmission using the OFDM method.

24. The method according to claim 10, wherein the communications users include at least one of (a) drive assemblies, (b) inverter motors, and (c) matching controllers for feeding of loads.

25. The method according to claim 10, wherein the bus is a multi-master bus system.

26. A converter, comprising:
a device adapted to at least one of (a) transmit and (b) receive data via a bus using an OFDM method, the device adapted to perform the method according to claim 10.

27. A method for bus arbitration, a plurality of communications users being provided as bus users on a bus, each communications user being assigned a unique address as a sequence of numerals, the bus being clocked with a bus clocking, comprising:
upon initiating communication, transmitting, by each communications user, the numerals in an order of the sequence of the address one after another for a duration of one clock-pulse segment of the bus clocking as at least one of (a) an FDM signal and (b) an OFDM signal onto the bus;
at the same time, listening in to the at least one of (a) the FDM signal and (b) the OFDM signal present on the bus; and
in a following clock-pulse segment, dropping out of arbitration upon determining a further communications user having an instantaneously transmitted numeral with a higher priority;
wherein the bus includes a plurality of communication channels;
wherein each communications user is assigned a number, the method further comprising, in a time sequence:
(i) determining, by the communications user, the first numeral in the numerical representation with respect to the base n of the number;
(ii) transmitting, by the communications user, a signal on the communication channel whose number is identical to the numeral determined, and at the same time listening in to remaining communication channels;
(iii) at least one of (a) breaking off the process and (b) entering into a different state when transmission was carried out during (ii) on a communication channel having a higher number than the numeral determined;
(iv) beginning, by the communications user, transmission of useful data if the numeral determined is the last numeral in the numerical representation with respect to the base n of its number; and
(v) determining, by the communications user, a next following numeral in the numerical representation with respect to the base n of its number and continuing with (ii).

28. A device for bus arbitration, comprising:
a plurality of communications users linked to a bus;
wherein each communications user includes a device adapted for arbitration and communication on a plurality of frequency channels;
wherein a communications user is configured to evaluate a communication channel as receiving a signal when a signal is detected on at least one subchannel of the communication channel;
wherein a communications user transmits a signal on a reserved communication channel when it is definite for the communications user, based on the signals present on the bus, that it will win an arbitration process, and the communications users which receive a signal on the reserved communication channel terminate drop out of the arbitration if they are not winners of the arbitration process.

29. The device according to claim 28, wherein the frequency channels are frequency bands, differing from each other, on one common carrier.

30. The device according to claim 28, wherein the communications users at least one of (a) are suppliable via an energy bus and (b) include a device for communication via the energy bus on the plurality of frequency channels.

31. The device according to claim 28, wherein the communications users at least one of (a) are suppliable in non-contact fashion via an energy bus and (b) include a device for contactless communication via the energy bus on the plurality of frequency channels, using an OFDM method.

32. The device according to claim 28, further comprising a device adapted to produce a phase shift of random magnitude between two signals.

33. The device according to claim 28, further comprising a device adapted for data conversion with the aid of at least one of (a) FFT and (b) IFFT.

34. The device according to claim 28, further comprising a device adapted to contactlessly draw energy from a primary conductor.

35. A production facility, comprising:
drive units suppliable with energy in contactless fashion; and
a bus via which data is exchangeable at least between the drive units;
wherein the drive units are adapted to perform a method for bus arbitration, comprising:
assigning each user that communicates via the bus a uniquely identifying sequence of identification units, a number n of numbered bidirectional communication channels being used, the number n being greater than one:
initiating, by at least one communications user, a communication;

at a beginning of communication in a first time interval with respect to the communication initiation, checking, by the at least one communications user, whether a further user having a higher priority is initiating a communication, the priority being determined by comparing information sent out via the communication channels upon initiating communication and information received from the further user via the communication channels upon initiating communication, the first time interval including a plurality of time segments;

in a first time segment, transmitting an identification unit by a communications user via the communication channels, and at the same time, detecting signals present on all communication channels;

upon agreement of the detected signals with the transmitted identification unit, in a time segment following the first time segment, continuing, by the communications user, with a next identification unit; and after transmitting a complete identification, beginning, by the communications user, a transmission of useful data;

wherein, in response to deviation of the detected signals from the transmitted identification unit, the communications user ascertains, from the deviating detected signals, the priorities of the further communications users which have transmitted signals, and in a time segment following the current time segment, the communications user continues with a next identification unit if no user possesses a higher priority;

wherein the communication channels are frequency bands, differing from each other, on one common carrier;

wherein a communication channel is evaluated by a communications user as receiving a signal when a signal is detected on at least one subchannel of the communication channel; and wherein zero crossings of the signal for contactless transfer of energy are used for synchronization of the communication by detecting a signal pulse which is emitted close in time to the zero crossing.

36. A production facility, comprising:

drive units suppliable with energy in contactless fashion; and a bus via which data is exchangeable at least between the drive units;

wherein the drive units are adapted to perform a method for bus arbitration, a plurality of communications users being provided as bus users on the bus, each communications user being assigned a unique address as a sequence of numerals, the bus being clocked with a bus clocking, the method comprising:

upon initiating communication, transmitting, by each communications user, the numerals in an order of the sequence of the address one after another for a duration of one clock-pulse segment of the bus clocking as at least one of (a) an FDM signal and (b) an OFDM signal onto the bus;

at the same time, listening in to the at least one of (a) the FDM signal and (b) the OFDM signal present on the bus; and in a following clock-pulse segment, dropping out of arbitration upon determining a further communications user having an instantaneously transmitted numeral with a higher priority;

wherein zero crossings of the signal for contactless transfer of energy are used for synchronization of the communication by detecting a signal pulse which is emitted close in time to the zero crossing.

* * * * *